US012380163B2

(12) United States Patent
Alonso et al.

(10) Patent No.: US 12,380,163 B2
(45) Date of Patent: *Aug. 5, 2025

(54) EFFICIENT STORAGE AND QUERY OF SCHEMALESS DATA

(71) Applicant: Google LLC, Mountain View, CA (US)

(72) Inventors: Luis Alonso, Mountain View, CA (US); Vladislav Grachev, Bothell, WA (US); Hossein Ahmadi, Seattle, WA (US); Srinagesh Susarla, Saratoga, CA (US); Francis Lan, San Francisco, CA (US); Srinidhi Raghavan, Mountain View, CA (US); Vinay Balasubramaniam, Sammamish, WA (US); Oleksandr Blyzniuchenko, Redmond, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,465

(22) Filed: Oct. 9, 2023

(65) Prior Publication Data

US 2024/0037146 A1 Feb. 1, 2024

Related U.S. Application Data

(63) Continuation of application No. 17/308,986, filed on May 5, 2021, now Pat. No. 11,816,157.

(51) Int. Cl.
*G06F 16/84* (2019.01)
*G06F 16/22* (2019.01)
*G06F 16/2452* (2019.01)
*G06F 16/25* (2019.01)

(52) U.S. Cl.
CPC .......... *G06F 16/86* (2019.01); *G06F 16/2282* (2019.01); *G06F 16/2452* (2019.01); *G06F 16/258* (2019.01)

(58) Field of Classification Search
CPC .. G06F 16/86; G06F 16/2282; G06F 16/2452; G06F 16/258; G06F 16/81; G06F 16/84
See application file for complete search history.

(56) References Cited

U.S. PATENT DOCUMENTS 11,816,157 B2   11/2023  Alonso et al.
2017/0116273 A1   4/2017  Liu et al.
(Continued)

FOREIGN PATENT DOCUMENTS

JP   2019179504 A   10/2019
WO   2017/070251 A1   4/2017

OTHER PUBLICATIONS

Jul. 20, 2022 Written Opinion (WO) of the International Searching Authority (ISA) and International Search Report (ISR) issued in International Application No. PCT/US2022/071973.
(Continued)

*Primary Examiner* — Albert M Phillips, III
(74) *Attorney, Agent, or Firm* — Shumaker & Sieffert, P.A.

(57) ABSTRACT

A method of storing semi-structured data includes receiving user data from a user of a query system where the user data includes semi-structured user data. The method also includes receiving an indication that the semi-structured user data fails to include a fixed schema. In response to the indication that the semi-structured user data fails to include the fixed schema, the method further includes parsing the semi-structured user data into a plurality of data paths and extracting a data type associated with each respective data path of the plurality of data paths. The method additionally includes storing the semi-structured user data as a row entry in a table of a database in communication with the query system wherein each column value associated with the row entry corresponds to a respective one of the plurality of data
(Continued)

paths and the data type associated with the respective data path.

20 Claims, 11 Drawing Sheets

(56) References Cited

U.S. PATENT DOCUMENTS

| | | | |
|---|---|---|---|
| 2017/0206256 | A1 | 7/2017 | Tsirogiannis et al. |
| 2019/0303381 | A1 | 10/2019 | Nakamura |
| 2019/0311050 | A1 | 10/2019 | Capillo Carril |
| 2020/0285643 | A1 | 9/2020 | Kadiam et al. |
| 2020/0401506 | A1 | 12/2020 | Sathianarayanan et al. |
| 2021/0019291 | A1 | 1/2021 | Probst |
| 2021/0103591 | A1 | 4/2021 | Motamedi |
| 2021/0133204 | A1 | 5/2021 | Motamedi et al. |
| 2021/0390420 | A1 | 12/2021 | Barnett |

OTHER PUBLICATIONS

Chrome Developer Tools: Inspect JSON path and extract data quickly, pp. 1-4 (Year: 2020).
Trick #8—Data Extraction with JSON Path, pp. 1-3 (Year: 2020).
Querying and Manipulating JSON Data with T-SQL, pp. 1-9 (Year: 2020).
The JSON_QUERY0 function to extract objects from JSON Data, pp. 1-9 (Year: 2020).
USPTO. Office Action relating to U.S. Appl. No. 17/308,986 dated Mar. 15, 2023.
The JSON_QUERYO function to extract objects from JSON Data, pp. 1-9 (Year: 2020).
Decision of Rejection from counterpart Japanese Application No. 2023568071 dated Jan. 17, 2024, 6 pp.
Office Action, and translation thereof, from counterpart Japanese Application No. 2023-568071 dated Oct. 3, 2024, 6 pp.
Prosecution History from U.S. Appl. No. 17/308,986, now issued U.S. Patent 11,816, 157, dated Mar. 15, 2023, through Jul. 16, 2023, 48 pp.
Response to Communication Pursuant to Rules 161(1) and 162 EPC dated Jan. 4, 2024, from counterpart European Application No. 22726363.9, filed Jul. 3, 2024, 22 pp.
Notice of Appeal, Appeal Brief and Written Amendment dated Jan. 28, 2024, from counterpart Japanese Application No. 2023-568071 filed Apr. 18, 2025, 12 pp.
Response to Office Action dated Oct. 3, 2024, from counterpart Japanese Application No. 2023-568071 filed Nov. 19, 2024, 14 pp.
First Office Action and Search Report from counterpart Indian Application No. 202347080923 dated May 1, 2025, 10 pp.

Record 1:
{
"component" : "sprocket",
"cost" : 23,
"manufacturer" : {
  "name" : "Sprocket Labs",
  "location" : {
    "address"
  }, "company_id
}

Record 2:
{
"component" : wh
"cost" : 700.23,
"manufacturer" : {
  "name" : "Ro
  "location" : {
    "address"
  },
"company_id" : 83724,
}

Table 204

| Record | Component | Cost | Mfg Name | Mfg Location Address | Mfg Company_ID |
|---|---|---|---|---|---|
| R1 | Sproket | 23 | Sprocket Labs | [null, Anaheim, CA] | 91724 |
| R2 | Wheel | 700.23 | Roundabout | [2pi Drive, Walla Walla, WA] | 83724 |
| ... | ... | ... | ... | ... | ... |
| Rn | | | | [..., ...] | |

EFFICIENT STORAGE AND QUERY OF SCHEMALESS DATA

CROSS REFERENCE TO RELATED APPLICATIONS

This U.S. patent application is a continuation of, and claims priority under 35 U.S.C. § 120 from, U.S. patent application Ser. No. 17/308,986, filed on May 5, 2021. The disclosure of this prior application is considered part of the disclosure of this application and is hereby incorporated by reference in its entirety.

TECHNICAL FIELD

This disclosure relates to efficient storage and query of schemaless data.

BACKGROUND

As applications today generate significant amounts of data, query systems and other analytical tools continue to evolve to support data analysis. Moreover, if a user is unable to perform analysis over his or her data in a manner that is efficient and/or cost-effective, the value of generating a vast amount of user data may significantly diminish. To ensure that a user is able to analyze his or her data, query processing systems have begun to operate in conjunction with data storage systems. By cooperating, the user data may be stored in a storage structure that promotes analytical operations such as queries or other analytics. Unfortunately, data storage structures that promote these operations are often limited in their ability to support semi-structured or schemaless data.

SUMMARY

One aspect of the disclosure provides a computer-implemented method of storing semi-structured data. The method, when executed by data processing hardware causes the data processing hardware to perform operations. The operations include receiving user data from a user of a query system where the user data includes unstructured user data. The operations also include receiving an indication that the unstructured user data fails to include a fixed schema. In response to the indication that the unstructured user data fails to include the fixed schema, the operations further include parsing the unstructured user data into a plurality of data paths and extracting a data type associated with each respective data path of the plurality of data paths. The operations additionally include storing the unstructured user data as a row entry in a table of a database in communication with the query system wherein each column value associated with the row entry corresponds to a respective one of the plurality of data paths and the data type associated with the respective data path.

Another aspect of the disclosure provides a system capable of storing unstructured data. The system includes data processing hardware and memory hardware in communication with the data processing hardware. The memory hardware stores instructions that when executed on the data processing hardware cause the data processing hardware to perform operations. The operations include receiving user data from a user of a query system where the user data includes unstructured user data. The operations also include receiving an indication that the unstructured user data fails to include a fixed schema. In response to the indication that the unstructured user data fails to include the fixed schema, the operations further include parsing the unstructured user data into a plurality of data paths and extracting a data type associated with each respective data path of the plurality of data paths. The operations additionally include storing the unstructured user data as a row entry in a table of a database in communication with the query system wherein each column value associated with the row entry corresponds to a respective one of the plurality of data paths and the data type associated with the respective data path.

Implementations of the method or the system of the disclosure may include one or more of the following optional features. In some implementations, the user data further includes structured user data having a respective fixed schema and the table of the database includes one or more row entries corresponding to the structured user data. In some examples, the unstructured user data includes JavaScript Object Notation (JSON). In these examples, a respective column associated with a row entry may include an explicit null value. Also in these examples, a respective column value of a respective column associated with the row entry may include an empty array. In some configurations, storing the unstructured user data as the row entry in the table of the database further includes identifying a first data type and a second data type associated with a first data path among the plurality of data paths parsed from the unstructured data. In these configurations, storing the unstructured user data as the row entry in the table of the database also includes storing a first value of the unstructured user data corresponding to the first data type of the first data path in a first row entry of a first column of the table and storing a second value of the unstructured user data corresponding to the second data type of the first data path in a second row entry of the first column of the table. Here, the second data type is a different data type than the first data type.

In some examples, the operations for the method or the system also include, during query runtime, receiving, from the user of the query system, a query for data associated with the stored unstructured data, determining a respective data path of the stored unstructured data that is responsive to the query, and generating a query response that includes a respective column value of the row entry corresponding to the respective data path of the stored unstructured data that is responsive to the query. The user data may correspond to log data for cloud computing resources associated with the user. Each data path of the plurality of data paths may correspond to a key for a key-value pair of the unstructured user data. A respective column value of the row entry may include a nested array.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2H are schematic views of example schema managers for the data management environment of FIG. 1.

Like reference symbols in the various drawings indicate like elements.

DETAILED DESCRIPTION

Figure 1:
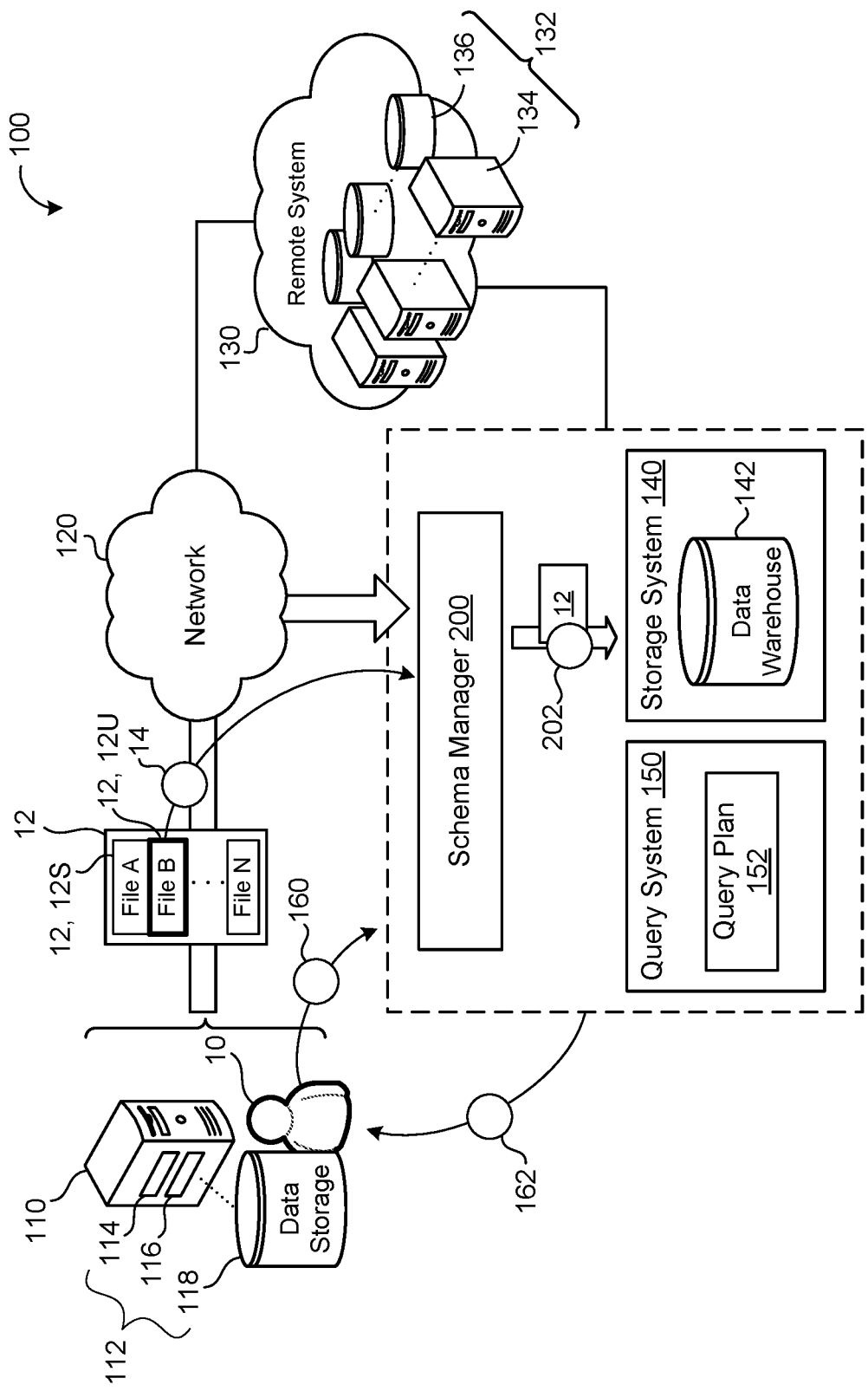
FIG. 1 is a schematic view of an example data management environment.

Data storage systems may store user or client data in one or more large query-able tables. The general structure of the table includes data in some form of individual records organized into rows called row entries. The length of a row of data may vary based on a schema of the table and/or a number of columns or fields that are associated with a particular record (i.e., row). A table schema refers to a designated format for a table that may define column names (e.g., fields), data types for particular columns, and/or other information. That is, the schema for a table is an integrity constraint imposed on the table that dictates how the table is organized. For instance, the table schema constrains the type of data or the form of the data in a particular column for one or more row entries. As an example, the schema for a particular column of the table is a name field that is a string and a value of a row entry for that column will be a name having the string data type.

In some implementations, the storage system is configured to generate the table schema based on attributes of the user data it receives. For instance, the storage system receives the user data in a row-oriented format with a particular schema prior to ingestion. In other implementations, the user or client coordinates with the storage system to define a schema for user data prior to any transfer of user data to the storage system. In either of these cases, the ability to query the stored user data depends on how the user data is stored within the data storage system. Therefore, when data for a record is stored as a row entry in a table based on table schema, the table schema impacts the query processing. For this reason, structured data, which refers to data that includes a designated schema, may facilitate ingestion as well as enable efficient read and/or write operations on the ingested data during query processing. For instance, each row of a table corresponds to a single purchase order from a parts supplier while the columns of the table include schema such as the name of the parts supplier (i.e., manufacturer name), the component(s) purchased, the cost of the component(s), the address of the supplier (i.e., the manufacturer), and a supplier identifier (i.e., a company identifier). When the storage system receives a new purchase order record, the storage system organizes the data within the record into the appropriate columns of a table. With this type of organization, storage systems are able to respond to queries from a query system by planning one or more actions (e.g., read or write operations) using the table schema. To illustrate, a customer may use a query system that works in coordination with the storage system to ask which purchase orders occurred over a particular date range. In response to this query, the query processing generates a query plan that sorts the purchase orders by date and then filters out all dates that do not correspond to the particular date range designated by the query. The query processing then returns the sorted and filtered results as a response to the query. In other words, here, the query plan performed by the query processing leverages the schema of the table with the purchase orders to fulfill the query efficiently (e.g., with minimal latency).

Unfortunately, the reality is that user data comes in all forms. What this means is that although structured user data with designated schema may be preferred for ease of ingestion and/or query processing, user data may also be unstructured data or semi-structured data. Here, unstructured or semi-structured data refers to data that does not have a fixed schema. For instance, unstructured data may refer to data that is wholly or entirely without schema while semi-structured data may refer to data that is partially without schema. Therefore, the terms unstructured data or semi-structured data refer to data in which some portion of the data does not have fixed schema. This unstructured or semi-structured data may also be referred to as "schemaless" data because the structure of the data can change entry to entry (i.e., record to record). Therefore, from a storage perspective, it is not always readily apparent how to organize a table of multiple records that stem from schemaless data. Due to the dynamic and not-fixed nature of at least partially unstructured data, this unstructured data has traditionally posed an issue for query systems and the underlying storage system. For instance, without a fixed schema, the ingestion process may have difficulty columnarizing the at least partially unstructured data into a table in a manner that is efficient for query processing.

To compound the issue, a client or user may not want to designate a particular schema for the portion of unstructured data. For instance, a client may not feel confident in their ability to generate meaningful schema from a query processing and/or data storage perspective. Additionally or alternatively, the user data may correspond to data that is automatically generated for the user (e.g., machine-generated data). As an example, the user may use a cloud computing environment and the cloud computing environment may report on the state of the user's data (or resources) by generating log files. In this situation, having the user generate schema for this form of user data (e.g., user data log files) may burden the user or be outside the user's ability. In other words, the user may not know what pertinent schema should be designated for these types of files. In these scenarios, the query system and/or storage system need an approach that is therefore not reliant on the user.

Moreover, unstructured or semi-structured data is increasing in popularity because certain unstructured data formats are easy to create. This is especially true in the machine-generated context when it is easy for data to be automatically generated in some portion of an unstructured form (e.g., in automatically generated log files). One such popular data format is JavaScript Object Notation (JSON). JSON data is an increasingly common schemaless file format that often functions as a data interchange format. JSON is popular in part because it is language independent; meaning that JSON is compatible with all programming languages. Additionally, JSON is a text-based and a lightweight format, which allows it to be easily generated whether generated by a user or generated by a machine. Although JSON data has some form of text structure and key-value or attribute-value notation, its structure is not fixed from one record to another. Since JSON data lacks a consistent structure, efficiently querying JSON data is difficult in part because query processing cannot use formal schema in query planning or in query validation.

With JSON specifically, there have been some approaches to perform query processing for JSON data. In one approach, some systems will interpret the entirety of a JSON file as a string. While this may preserve the data of the JSON file, it presents issues for query systems because many of the efficiencies (e.g., query speed) of the query system revolve around a fixed structure or schema. In other words, the fixed schema associated with data entries enables the query system to develop efficient query plans. Some of the efficiency for query planning and query execution is that an entirety of a data entry or entries does not have to be read during query processing. However, when a storage system stores a JSON file as a string, a query for a particular entry or record of the JSON file generally forces the query processing to address the entire string rather than only a portion of the entry. That is, the query processing generally has to read the entirety of the string to identify relevant portions for the response to the query. In this sense, the string-based storage approach to JSON data has traditionally been less than ideal for query systems.

To address some of these issues posed by data where at least some portion is unstructured, (e.g., unstructured or semi-structured data), the approach described herein promotes efficient storage and/or retrieval of such data (e.g., unstructured or semi-structured data) by extracting schema from the data. Although this approach is hereinafter generally referred to with respect to semi-structured data, the detailed approach may be used for any data that is entirely (e.g., unstructured data) or partially schemaless. By extracting schema from semi-structured data, this approach also avoids relying on a user during schema generation for the semi-structured data. Here, an operation during ingestion processes the semi-structured data and shreds it into a columnar format to extract the schema from the semi-structured data for storage and query purposes. With the semi-structured data stored based on its extracted schema in the storage system, when a query requests only a portion the semi-structured data, the extracted schema allows the query processing to occur only at the requested portion to generate a query result (also referred to as a query response). For instance, when the query requests a portion of the semi-structured data in a particular column of a row entry, the query processing uses the extracted schema to read only values in the particular column rather than reading the entirety of the semi-structured data (or some larger portion thereof).

The extraction approach may also provide the additional advantage that both semi-structured and structured data may be ingested by the storage system during the ingestion process. In other words, during ingestion, the storage system ingests a single blob of user data per row that contains both structured and semi-structured data. Being able to process both forms of data may be advantageous to the user because the user does not have to initiate two different ingestion processes (i.e., one for the structured data and one for the semi-structured data). For instance, a record having structured data can have a field that is semi-structured such that the storage system may store an unstructured portion of data in the same table as structured data In this respect, a query result may return a response that includes data from both the structured data and the semi-structured data; allowing the query process to be more robust over different data structures.

FIG. 1 illustrates an example of a data management environment 100. A user device 110 associated with a user 10 generates user data 12 during execution of its computing resources 112 (e.g., data processing hardware 114 and/or memory hardware 116). For example, the user 10 uses applications operating on data processing hardware 114 of the user device 110 to generate the user data 12. Since various applications have the ability to generate user data 12, the user 10 often utilizes other systems (e.g., a remote system 130, a storage system 140, or a query system 150) for user data storage and/or user data management.

In some examples, the user device 110 is a local device (e.g., associated with a location of the user 10) that uses its own computing resources 112 with the ability to communicate (e.g., via the network 120) with one or more remote systems 130. Additionally or alternatively, the user device 110 leverages its access to remote resources (e.g., remote computing resources 132) to operate applications for the user 10. User data 12 generated through the use of the user device 110 may be initially stored locally (e.g., such as in data storage 118 of the memory hardware 116) and then communicated to a remote system 130 or sent upon creation through a network 120 to the remote system 130. For example, the user device 110 communicates the user data 12 to a storage system 140 using the remote system 130.

In some examples, the user 10 utilizes the computing resources 132 of the remote system 130 (e.g., a cloud computing environment) for storage of the user data 12. In these examples, the remote system 130 may receive user data 12 as it is being generated by various user applications (e.g., streaming data). Here, a data stream (e.g., of the user data 12) refers to a continuous or generally continuous feed of data arriving at the remote system 130 for storage and/or further processing. In some configurations, instead of continuously streaming user data 12 to the remote system 130, the user 10 and/or the remote system 130 configures the user data 12 to be sent in batches (e.g., at interval frequency) for processing. Much like the user device 110, the remote system 130 includes computing resources 132 such as remote data processing hardware 134 (e.g., server and/or CPUs) and memory hardware 136 (e.g., disks, databases, or other forms of data storage).

In some configurations, the remote computing resources 132 are resources utilized by various systems associated and/or communicating with the remote system 130. As shown in FIG. 1, these systems may include a storage system 140 and/or a query system 150. In some examples, the functionality of these systems 140, 150 may be integrated together in different permutations (e.g., built-on each other) or separate systems with the ability to communicate with each other. For example, the storage system 140 and the query system 150 may be combined into a single system (e.g., as shown by the dotted line around these systems in FIG. 1). The remote system 130 with its computing resources 132 may be configured to host one or more functions of these systems 140, 150. In some implementations, the remote system 130 is a distributed system whose computing resources 132 are distributed across one or more locations accessible via the network 120.

In some examples, the storage system 140 is configured to operate a data warehouse 142 (e.g., a data store and/or a plurality of databases) as a means of data storage for the user 10 (or multiple users). Generally speaking, a data warehouse 142 stores data from one or more sources and may be designed to analyze, report, and/or integrate data from its sources. A data warehouse 142 enables users (e.g., organizational users) to have a central storage depository and storage data access point. By containing user data 12 in a central depository such as a data warehouse 142, the data warehouse 142 may simplify data retrieval for functions such as data analysis and/or data reporting (e.g., by the query system 150 and/or an analytics system). Furthermore, data warehouses 142 may be configured to store a significant amount of data such that a user 10 (e.g., an organizational user) can store large amounts of historical data to understand data trends. Being that data warehouses 142 may be the main or sole data storage depository for a user's data 12, the storage system 140 may often be receiving large amounts of data (e.g., gigabytes per second, terabytes per second, or more) from user devices 110 associated with the user 10. Additionally or alternatively, as a storage system 140, the storage system 140 and/or storage warehouse 142 may be configured for data security (e.g., data redundancy), for multiple users from a single data source (e.g., multiple employees of an organization), and/or for simultaneous multi-user access. In some configurations, the data warehouse 142 is persistent and/or non-volatile such that data, by default, is not overwritten or erased by new incoming data.

The query system 150 is configured to request information or data from the storage system 140 in the form of a query 160. In some examples, the query 160 is initiated by the user 10 as a request for user data 12 within the storage system 140 (e.g., an export data request). For instance, the user 10 interacts with the query system 150 (e.g., an interface associated with the query system 150) to retrieve user data 12 being stored in the data warehouse 142 of the storage system 140. Here, the query 160 may be user-originated (i.e., directly requested by the user 10) or system-originated (i.e., configured by the query system 150 itself). In some examples, the query system 150 configures routine or repeating queries 160 (e.g., at some designated frequency) to allow the user 10 to perform analytics or to monitor user data 12 stored in the storage system 140.

The format of a query 160 may vary, but generally includes reference to specific user data 12 stored in the storage system 140. Here, the query system 150 operates in conjunction with the storage system 140 such that the storage system 140 stores the user data 12 according to a particular schema and the query system 150 may generate queries 160 based on information regarding the particular schema. For example, data storage systems 140 store user data 12 in a table format where the user data 12 populates rows and columns of a table. With a table format, the user data 12 within the table has rows and columns that correspond to the schemas associated with the user data 12. For example, the user data 12 may refer to purchase orders made by the user 10. In this example, the one or more tables storing the user data 12 may include columns for a purchased component, a cost of the component, a manufacturer of the purchased component, and details about the manufacturer (e.g., the manufacturer address and/or a manufacturer company identifier). Here, each row corresponds to a record or entry (e.g., a purchase order) where each column value associated with the row entry in a column of the table corresponds to a particular portion of the schema. Since the storage system 140 may receive the user data 12 according to a particular schema (e.g., a schema indicated by a schema manager 200), the storage system 140 is configured to store the user data 12 such that elements of the format (e.g., relationships, headings, or other schema) associated with the user data 12 (e.g., providing further context or definition to the user data 12) are accessible to the query system 150.

In response to a query 160, the query system 150 generates a query response 162 fulfilling or attempting to fulfill the request of the query 160 (e.g., a request for particular user data 12). Generally speaking, the query response 162 includes user data 12 that the query system 150 requests in the query 160. The query system 150 may return this query response 162 to an entity that originates the query 160 (e.g., the user 10) or another entity or system communicating with the query system 150. For example, the query 160 itself or the query system 150 may specify that the query system 150 communicates one or more query responses 162 to a system associated with the user 10, such as an analytics system. For instance, a user 10 uses an analytics system to perform analytics on user data 12. Often, query systems 150 are set up to generate routine queries 160 on the user data 12 within the storage system 140 to enable an analytics system to perform its analytics (e.g., at particular frequencies). For example, the query system 150 executes a daily query 160 to pull the last seven days of user log data for the analytics system to analyze and/or to represent.

In some implementations, when the query system 150 receives input for a query 160, the query system 150 is configured to determine a query plan 152 in order to execute the query 160. In other words, a query 160 often refers to a table at large on a basic level without particular reference to the actual structure of the table in the storage system 140. For example, a query 160 simply states, query the table of user data 12 in the storage system 140 to export purchasing data for the manufacturer of Sprocket Labs over the past six months. The query 160 input format is simplified for ease of use as a user interface in order to abstract from the more complex table and/or storage structure of the user data 12 in the storage system 140. Therefore, the user 10 executing or writing a query 160 does not need to know the actual storage structure, but rather only the schema or fields of a table structure at a high level to generate queries 160. The query system 150, in combination with the storage system 140, is able to decompose a query 160 from a user 10 and rewrite the query 160 into a format that identifies potential operators (e.g., read/write operations) on the user data 12 to perform the query 160 on the underlying structure of the user data 12. That is, when the query system 150 receives a query 160, it digests the query 160 and plans how to execute the query 160 on the actual structure of storage system 140. This planning may require identifying the subsets of the table (e.g., partitions) and/or the files for the table that correspond to the query 160.

Referring to FIGS. 1 and 2A-2H, the data management environment 100 also includes a schema manager 200 (also referred to as the manager 200). The manager 200 is configured to manage schema extraction during user data ingestion. Here, schema extraction refers to the process of generating schema for semi-structured user data 12, 12U during ingestion and storage (e.g., by the storage system 140). The schema extraction generally occurs during ingestion, but may, depending on the configuration needs of the larger system, occur prior to ingestion as a pre-processing step. The manager 200 performs schema extraction because semi-structured user data 12U, in contrast to structured user data 12, 12S, does not include a fixed schema. Without a fixed schema, the manager 200 instead extracts schema for the semi-structured user data 12U that enables the user data 12 (e.g., both structured data 12S and semi-structured data 12U) to be shredded and stored in the storage system 140. The schema extraction by the manager 200 occurs when the user data 12 is being actually loaded to the storage system 140 (e.g., during ingestion) so that the manager 200 designates how the user data 12 will be stored in one or more tables 204 of the storage system 140. The manager 200 may extract schema for semi-structured user data 12U by executing and/or coordinating operations related to systems 140, 150 for the user 10 (e.g., storage operations, and/or query operations). For instance, the manager 200 analyzes the semi-structured user data 12U on "on-the-fly" as it is being processed and encoded during ingestion (e.g., to become a low-level storage component). In this respect, the characteristics of the semi-structured data (e.g., data path and/or data type) are taken into account by the manager 200 when deciding how and where to store/encode the semi-structured. That is, the manager 200 does not necessarily establish a schema for the semi-structured data 12U as a pre-processing step prior to ingestion and then apply that schema, but rather interprets a schema for the semi-structured data 12U as ingestion occurs. For example, this means that at any moment in time, there may not be a well-defined schema.

The functionality of the manager 200 may be centralized (e.g., reside in one of the systems 140, 150) or distributed among the systems 140, 150 depending on its design. In some examples, such as FIG. 1, the manager 200 is configured to receive user data 12 from the user 10 and to facilitate storage operations at the storage system 140. For instance, the manager 200 facilitates a data load request by the user 10. In response to the load request by the user 10, the manager 200 ingests the user data 12 and may translate the user data 12 into a query-friendly format based on schema associated with structured data 12S and/or extracted schema 202 associated with semi-structured data 12U. Here, ingestion refers to obtaining and/or importing the user data 12 into the storage system 140 (e.g., into the data warehouse 142) to allow system(s) to use the ingested user data 12 (e.g., by query systems 150). Generally speaking, data can be ingested in real-time where the manager 200 imports the data as it is being emitted from the source (e.g., the user 10 or user devices 110 of the user 10) or in batches where the manager 200 imports discrete chunks of data a periodic intervals of time.

To extract the schema from semi-structured data 12U, the manager 200 receives user data 12 from a user 10 that includes semi-structured data 12U. For instance, FIG. 1 depicts the user 10 communicating some number N of files to the manager 200 to be stored in the storage system 140 in a query-efficient format. Here, a first file A includes structured data 12, 12S while a second file B includes semi-structured data 12U (e.g., JSON data). When the user data 12 includes unstructured data 12U, the user 10 generally provides some indication 14 to the manager 200 that the user data 12 includes semi-structured data 12U. This indication 14 indicates to the manager 200 that the semi-structured data 12U fails to include fixed schema (e.g., like that of structured data 12S). In some implementations, when the user data 12 is mixed data that includes both structured data 12S and semi-structured data 12U, the indication 14 may additionally identify where the semi-structured data 12U starts and/or ends. The user 10 may use a user interface to coordinate the communication of the user data 12 to the manager 200 and storage system 140. Here, the user interface may include a field or some graphical component that when designated (or selected) indicates that the user data 12 includes semi-structured data 12U. In some examples, the manager 200 is able to detect that some portion of the user data 12 it receives is semi-structured data 12U. That is, the manager 200 may determine that a format of at least some of the user data 12 corresponds to semi-structured data 12U. For instance, the manager 200 recognizes that the user data 12 includes JSON data and is aware that JSON data is a common unstructured message/file format. Based on the indication 14 that the user data 12 includes semi-structured data 12U, the manager 200 generates extracted schema 202 for semi-structured data 12U during ingestion of the user data 12.

Figure 2A:
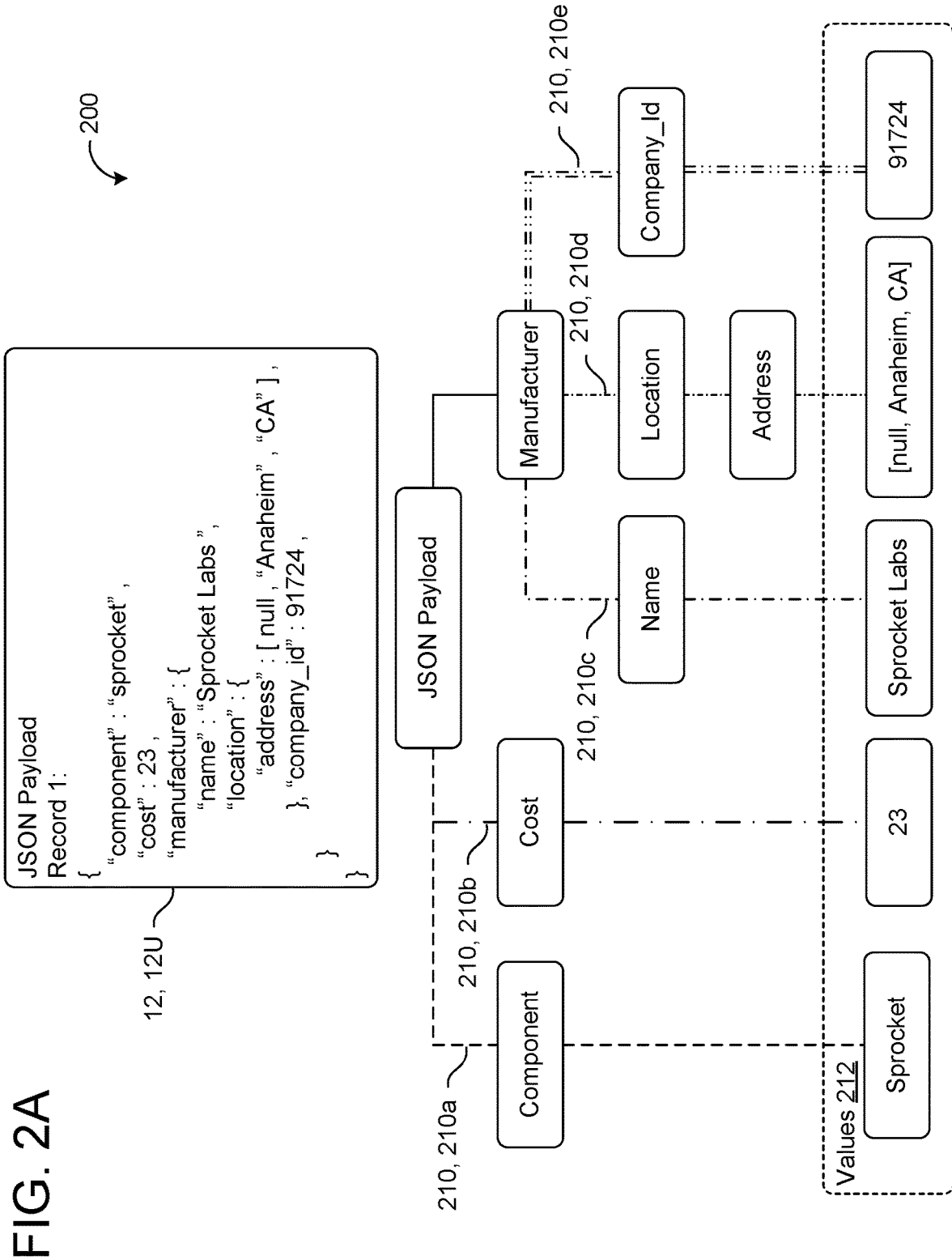
Figure 2B:
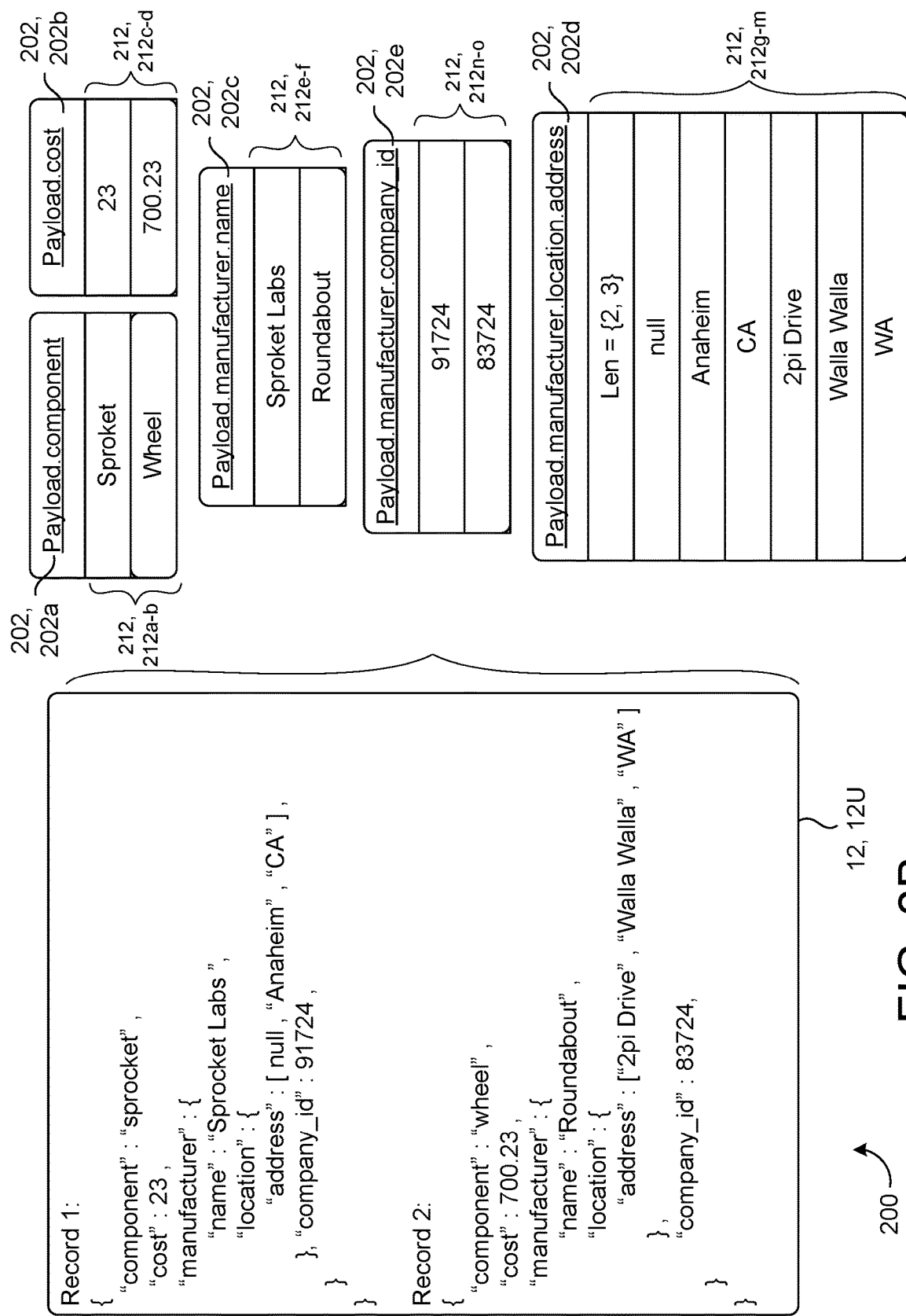

Referring to FIGS. 2A-2H, the manager 200 is configured to generate the extracted schema 202 for the semi-structured data 12U and to facilitate the storage of the semi-structured data 12U according to the extracted schema 202. When the manager 200 receives the indication 14 that the semi-structured data 12U fails to include a fixed schema, the manager 200 parses the semi-structured data 12U into a plurality of data paths 210, 210a—n. Referring to FIG. 2A, the semi-structured data 12U corresponds to a JSON payload with a single transactional record. Although semi-structured data 12U, such as JSON data, can include several records in a single message or file, FIG. 2A depicts a single record for ease of explanation.

Based on the text of the JSON payload, the manager 200 identifies five data paths 210, 210a—e of the semi-structured data 12U. In some examples, when the semi-structured data 12U is JSON data, each data path 210 corresponds to a representation of the key-value or the key-attribute structure within the semi-structured data 12U. For instance, in the first data path 210a, the key is the text "component" and the value 212 is the text "sprocket." Similarly, the second data path 210b has a key that corresponds to the text "cost" and a value 212 that corresponds to the number "23." FIG. 2A also illustrates that while parsing semi-structured data 12U, such as JSON data, the manager 200 may encounter a key with nested values or attributes. Here, the manager 200 may identify each nested key-value pair as a separate data path 210. For example, according to the text of the JSON payload, the "manufacturer" includes three attributes, a "name," a "location," and a "company_id." The first attribute of "manufacturer.name" causes the manager 200 to generate a third data path 210c. The second attribute of "manufacturer.location" causes the manager 200 to generate a fourth data path 210d and the third attribute of "manufacturer.company_id" causes the manager 200 to generate a fifth data path 210e. In this example, each of these paths 210 is associated with a particular value 212 as shown by the values 212 connected to each particular data path line.

Referring to FIGS. 2B-2G, in some implementations, the manager 200 uses each of the data paths 210 to generate the extracted schema 202. For instance, each key of a respective data path 210 becomes an individual column schema 202 where the column will store values 212 corresponding to that key. That is, once the manager 200 specifies the individual column schema 202, the manager 200 will perform ingestion of the semi-structured data 12U by storing the value(s) 212 from a record in the semi-structured data 12U that correspond to the column schema 202. Therefore, a column value associated with a row entry (e.g., Record 1) corresponds to the value 212 of the data path 210 that has been extracted to form the column schema 202. Here, storing the values 212 of the data path 210 in a columnar storage by this approach may result in storage efficiency, especially when combined with storage compression techniques (e.g., run length encoding) or other compatible data storage techniques on similar types of data.

In some examples, the manager 200 generates the extracted schema 202 by additionally taking into account the data type 220 of the parsed text. Here, the manager 200 considers the data type 220 because semi-structured data 12U may dynamically change data type 220 from record to record. In order to account for these changes when constructing the schema 202, the manager 200 may identify the types of data included in the semi-structured data 12U. For instance, the manager 200 determines the data type 220 associated with a particular data path 210. The data type 220 may also indicate when one data path 210 is different from, or has become different from, another data path 210. That is, for example, the data type 220 of a first value 212 associated with a first data path 210 may change when compared to the data type 220 of a second value 212 associated with the first data path 210 (e.g., between a first record and a second record). Due to this change in data type 220, the manager 200 may store the first value 212 in a different column with a different column schema 202 than the second value 212. By taking this approach, the manager 200 may be able to ensure that data type changes that happen from record to record do not compromise the query-efficient storage for the semi-structured data 12U. To illustrate, if a first record included a manufacturing name that is a string while a second record included a manufacturing name that is an integer, a query 160 that requests values 212 corresponding to the manufacturing name would result in a response 162 that may include both a string and an integer. Here, the user 10 may receive the query response 162 with both the string and the integer and not understand how the integer is a valid result of a query 160 for manufacturing names. Since this situation is feasible due to the nature of semi-structured data 12U, the manager 200 may extract the data type 220 to be contribute to additional constraints for the extracted schema 202. For instance, the additional constraints for the extracted schema 202 may be min/max statistics specific to particular data types 220. In other words, a string may have different min/max statistics from an integer (i.e., number). These additional constraints or statistics may therefore be used to prune portions of data (e.g., at file granularity) during read operations. In some examples, the functionality of the manager 200 allows the user 10 to have any type of messy data in data paths 210 such that a column or data path 210 may be a mix of data types 220 (e.g., strings and integers) to enable the user 10 to read his or her ingested data as is, no matter what data types 220 the values 212 correspond to.

Figure 2C:
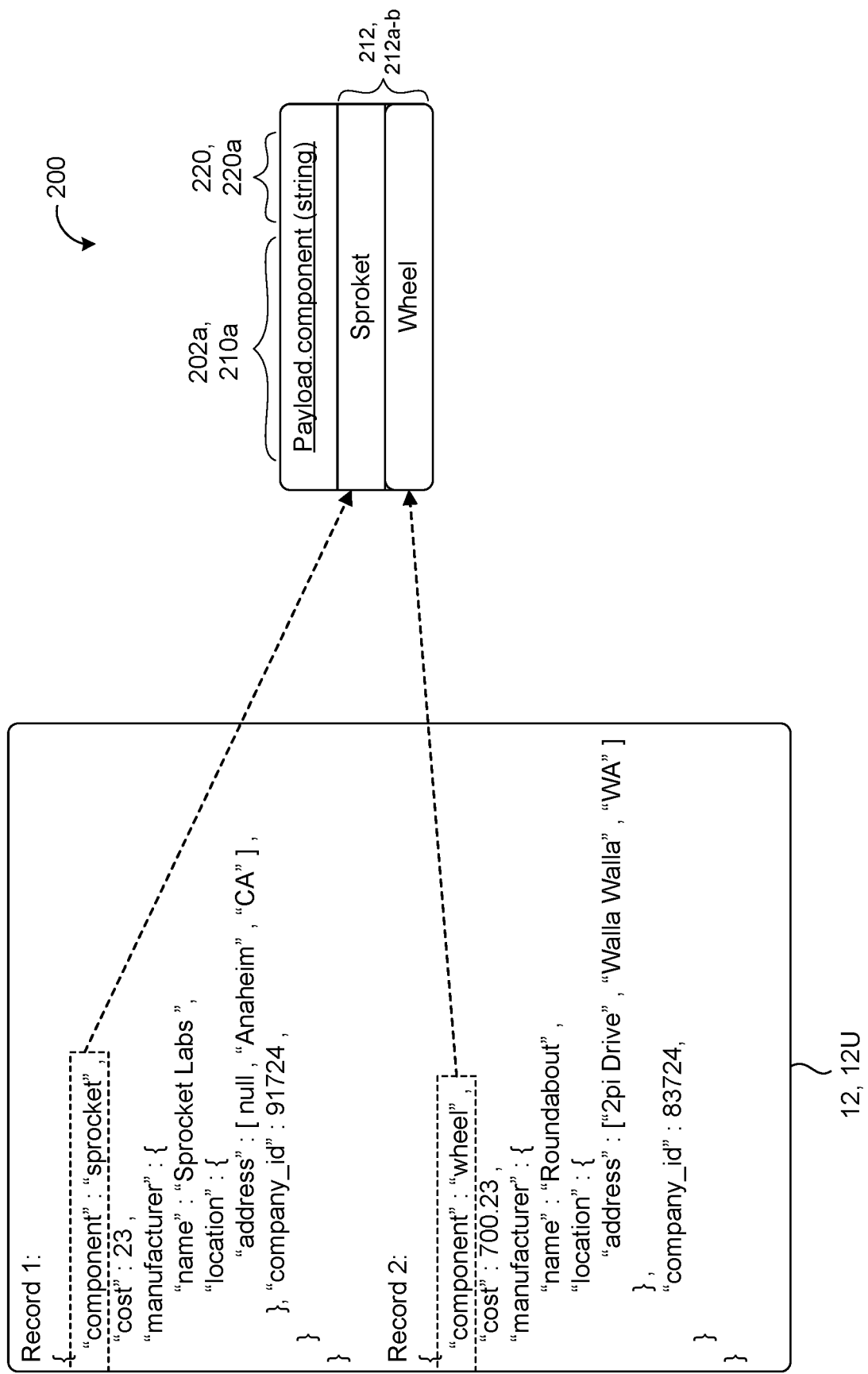
Figure 2D:
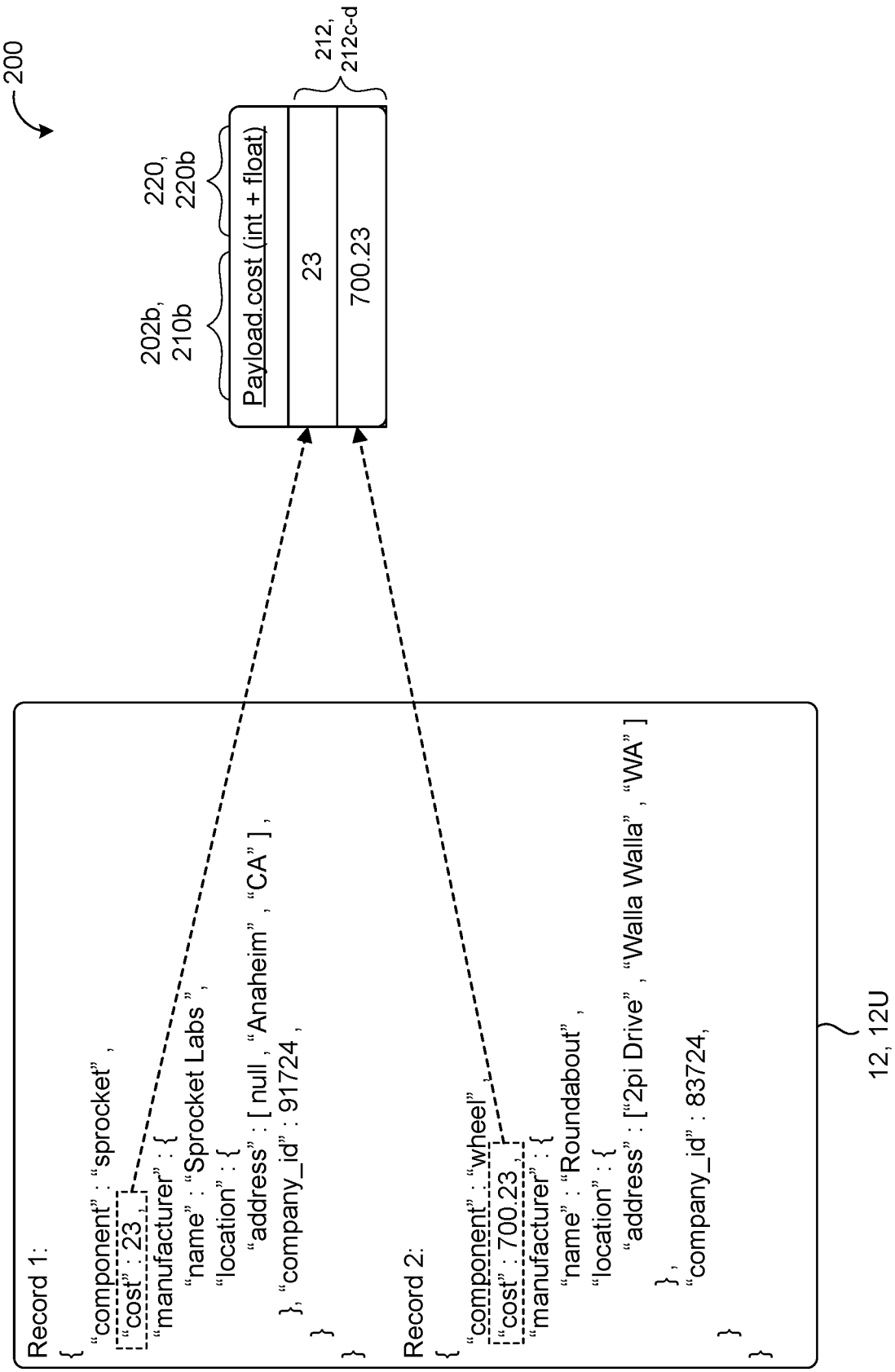
Figure 2E:
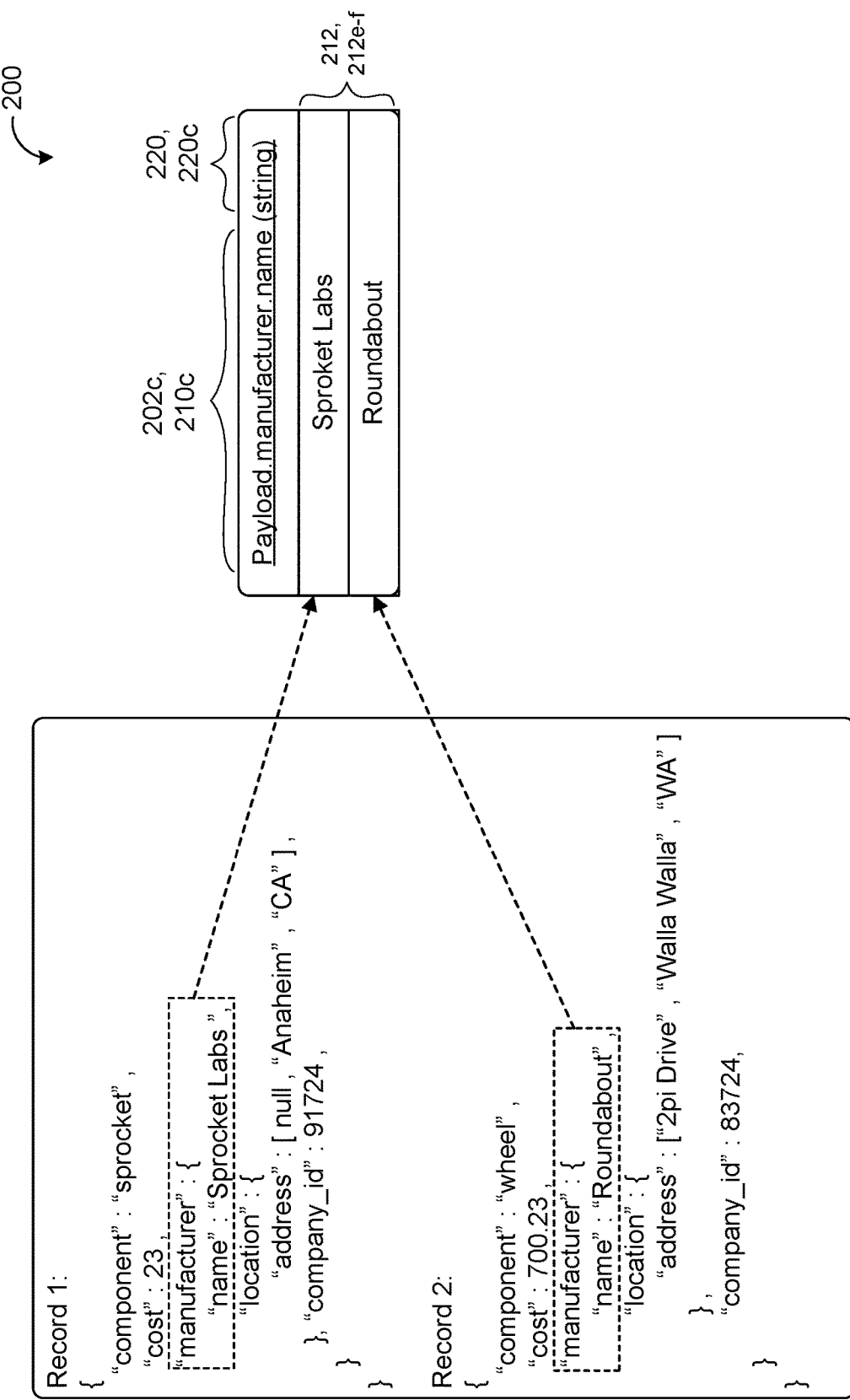
Figure 2F:
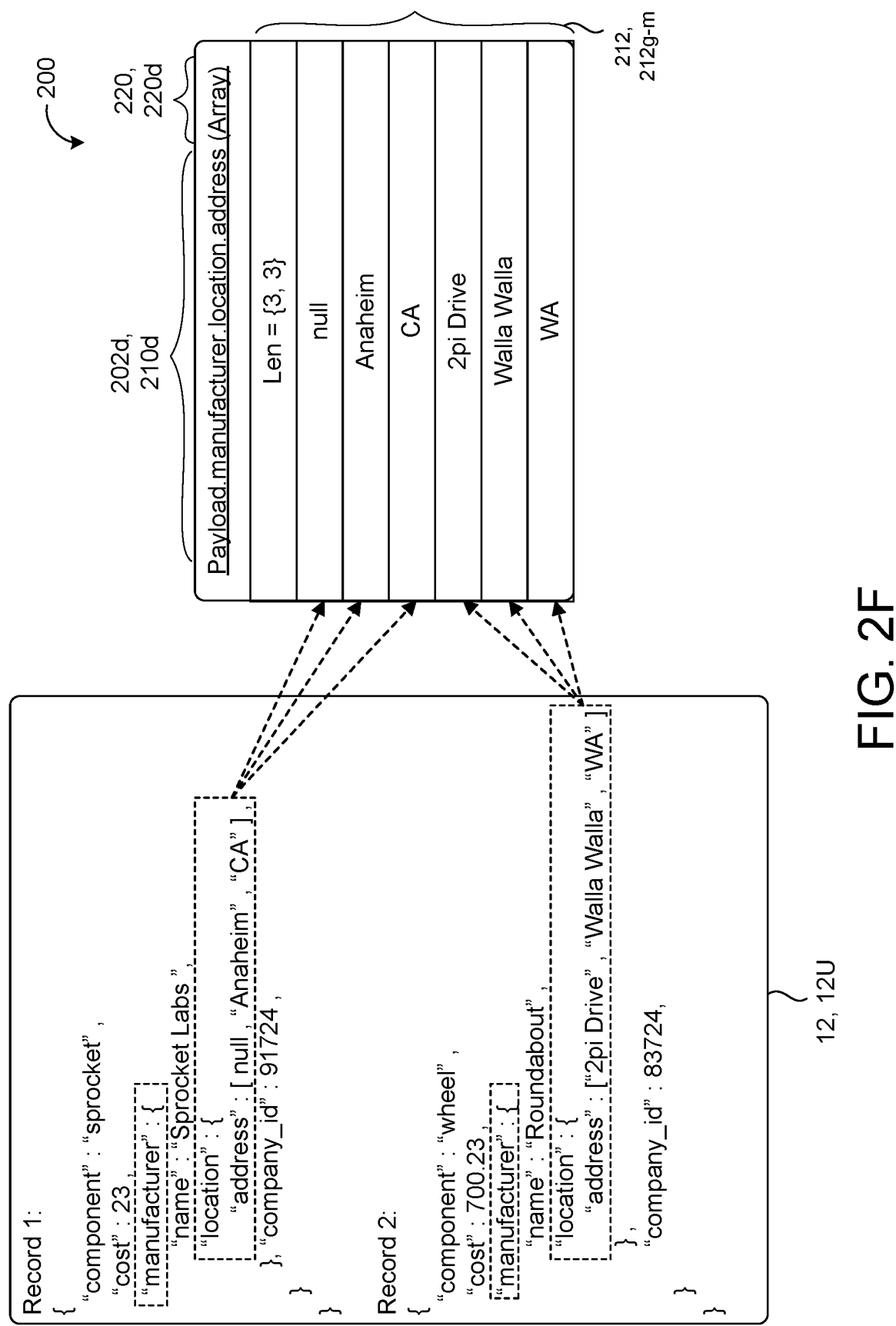
Figure 2G:
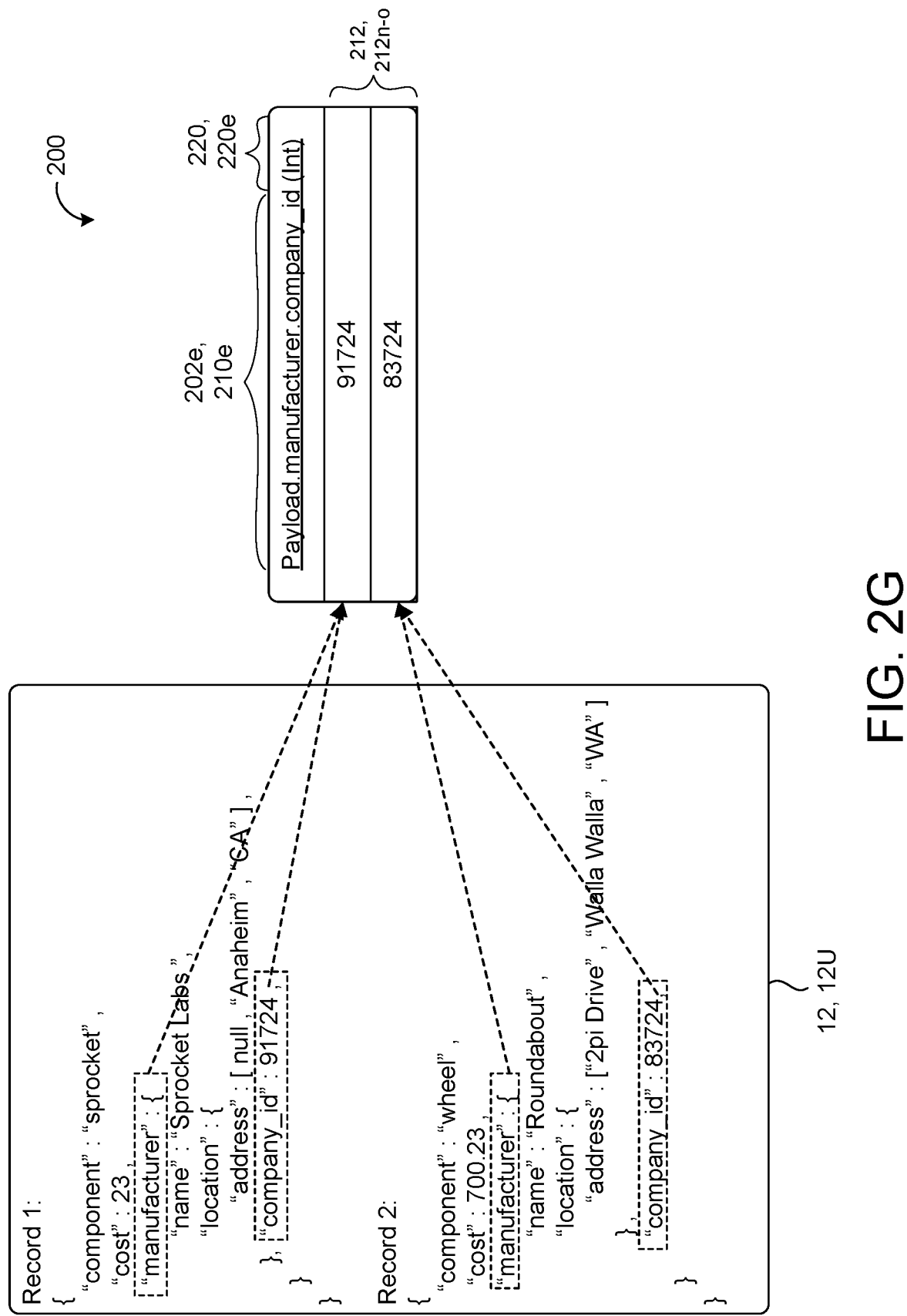

FIGS. 2B-2G are examples that depict the how the manager 200 shreds or columnarizes the values 212 from the semi-structured data 12U into individual columns constrained by the extracted schema 202. Here, as shown in greater detail in FIGS. 2C-2G, the extracted schema 202 also constrains which values 212 may be stored in which columns based on data type 220. In FIG. 2C, the first data path 210a corresponding to "component" becomes a first column schema 202, 202a with a first data type 220, 220a that is a string. Accordingly, the manager 200 stores the first value 212a of "sprocket" from the first record that is a string and the second value 212b of "wheel" from the second record that is a string as entries in the column with the first column schema 202a. In FIG. 2D, the second data path 210b corresponding to "cost" becomes the second column schema 202, 202b with a second data type 220, 220b that is an integer and a float. Here, the manager 200 stores the third value 212c of "23" and the fourth value 212d of "700.23" that are both either integers (e.g., "23") or floats (e.g., "700.23") as entries in the column with the second column schema 202b. In FIG. 2E, the third data path 210c corresponding to "manufacturer.name" becomes a third column schema 202, 202c with a third data type 220, 220c that is a string. In this example, the manager 200 stores the fifth value 212e of "Sprocket Labs" and the sixth value 212f of "Roundabout" that are both strings as entries in the column with the third column schema 202c. In FIG. 2F, the fourth data path 210d corresponding to "manufacturer.location.address" becomes a fourth column schema 202, 202d with a fourth data type 220, 220d that is an array. Here, the manager 200 stores values 222h—m that correspond to arrays from each record that identifies an address for a manufacturer as specified by the fourth column schema 202d. The column includes array lengths of how many times the value 212 repeats in its parent length. For example, len={3, 3} specifies that the first "address" has 3 values and the second "address" also has 3 values. In FIG. 2G, the fifth data path 210e corresponding to "manufacturer.company_id" becomes a fifth column schema 202, 202e with a fifth data type 220e that is an integer. In this example, the manager 200 stores the fourteenth value 212n of "91724" and the fifteenth value 212o of "83724" that are both integers as entries in the column with the fifth column schema 202e.

In some examples, the manager 200 may be configured to serialize a value 212. Serialization generally refers to the process of converting a value 212 to or from (e.g., sometimes referred to as deserialization) a given representation (e.g., a string representation). Therefore, when serialized data (e.g., a resulting series of bits) is reread in the context of the serialization format, the serialized data can be reconstructed to its original pre-serialized form. Here, the manager 200 may be configured to be compatible with a wide range of serialization formats (e.g., including format(s) particular to JSON data). As an example, in a case where a data path 210 has a data type 220 of an integer for a first row (e.g., a first record) and a data type 220 of a string in another row (e.g., a second second), the manager 200 may serialize one or both of these values 220. By serializing a value 212, the manager 200 may promote consistent query processing of the stored values 212.

FIG. 2F also illustrates that the manager 200 is capable of preserving potentially important information from the semi-structured data 12U when storing the semi-structured data 12U in the storage system 140. For instance, the manager 200 includes a row entry where the value 212 is an explicit null (e.g., value 212g). For example, an explicit null refers to a JSON null. That is, the manager 200 has a specific placeholder for a null and even positively states that an entry value 212 is a null. In contrast, some storage techniques may not store an explicit null or ignore an explicit null for storage purposes. Yet ignoring or removing an explicit null may cause downstream problems where a key with a null value is meaningful information. In some applications, it may be meaningful to know that a value does not exist (i.e., is null) rather than a value is missing (i.e., may exist, but is unknown). For instance, with JSON data, the presence of a JSON key within a JSON object has significance and, as such, preserving the null values are important. Similar to an explicit null value 212, the manager 200 may also store the semi-structured data 12U such that a respective column value 212 of a column includes an empty array (i.e., indicating that an array is the format for the value, but that no value is currently present for that array).

FIG. 2H depicts that the table 204 of the storage system 140 may be a single large table 204 where each column corresponds to the extracted schema 202 and each row is a record from one or more files/messages of user data 12. In other words, each table 204 of FIGS. 2A-2G may be integrated together to form the table 204 shown in FIG. 2H. Alternatively, a larger table 204 like the one shown in FIG. 2H may be partitioned into smaller tables 204 (e.g., columnar slices) such that query processing does not have to evaluate a large table, but rather smaller tables where the answer to a query 160 can be more efficiently ascertained than a large table.

With the extracted schema approach, the manager 200 is capable of shredding the semi-structured data 12U in a similar fashion to structured data 12S during ingestion such that the user data 12 is ready for query processing during query runtime. By shredding and storing semi-structured data 12U and structured data 12S in a similar fashion, the user data 12 regardless of structure can be stored together (e.g., in the same table 204) as well as, in some situations, jointly fulfill queries 160. Furthermore, by the manager 200 columnarizing the user data 12, the manager 200 ensures that semi-structured data 12U may have similar query and storage efficiencies to structured data 12S. For instance, the table storage scheme allows columnar processing during query processing where a query plan 152 does not need to read more data than is necessary to fulfill the query 160. That is, query processing may use the extracted schema 202 to filter or to compute a query response 162 at a data level that more closely aligns with the query itself. For instance, the query system 150 pushes down operations over the user data 12 using the extracted schema 202 to reduce the amount of read and/or write operations that occur during query processing.

Figure 3:
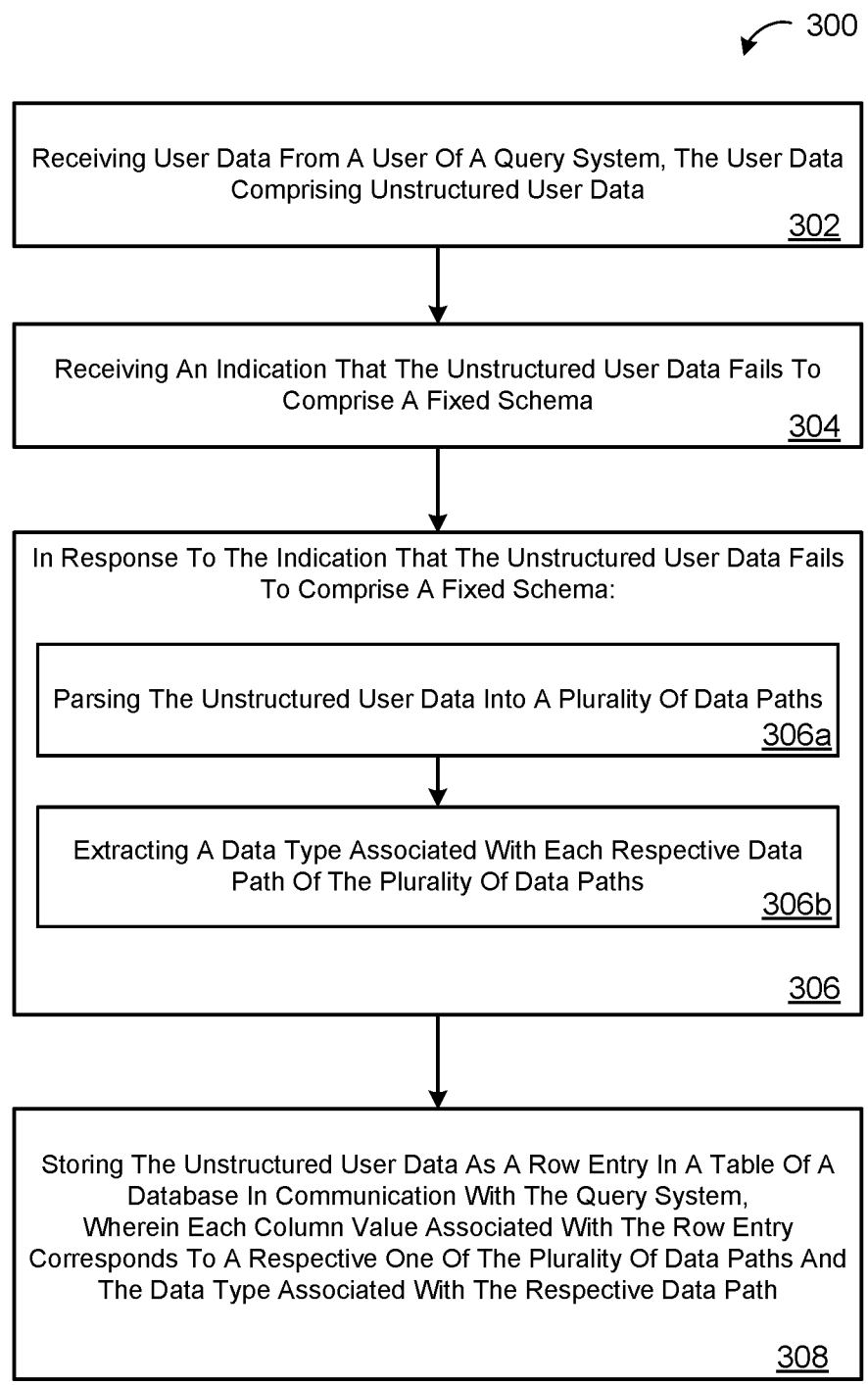
FIG. 3 is a flow chart of an example arrangement of operations for a method of storing unstructured data.

FIG. 3 is a flowchart of an example arrangement of operations for a method 300 of storing semi-structured data 12U. At operation 302, the method 300 receives user data 12 from a user 10 of a query system 150 where the user data 12 includes semi-structured user data 12U. At operations 304, the method 300 also receives an indication 14 that the semi-structured user data 12U fails to include a fixed schema. In response to the indication 14 that the semi-structured user data 12U fails to include a fixed schema, the method 300 performs operation 306 with two sub-operations 306, 306a—b. At sub-operations 306a, the method 300 parses the semi-structured user data 12U into a plurality of data paths 210. At sub-operations 306b, the method 300 extracts a data type 220 associated with each respective data path 210 of the plurality of data paths 210. At operation 308, the method 300 stores the semi-structured user data 12U as a row entry in a table 204 of a database in communication with the query system 150 wherein each column value 212 associated with the row entry corresponds to a respective one of the plurality of data paths 210 and the data type 220 associated with the respective data path 210.

Figure 4:
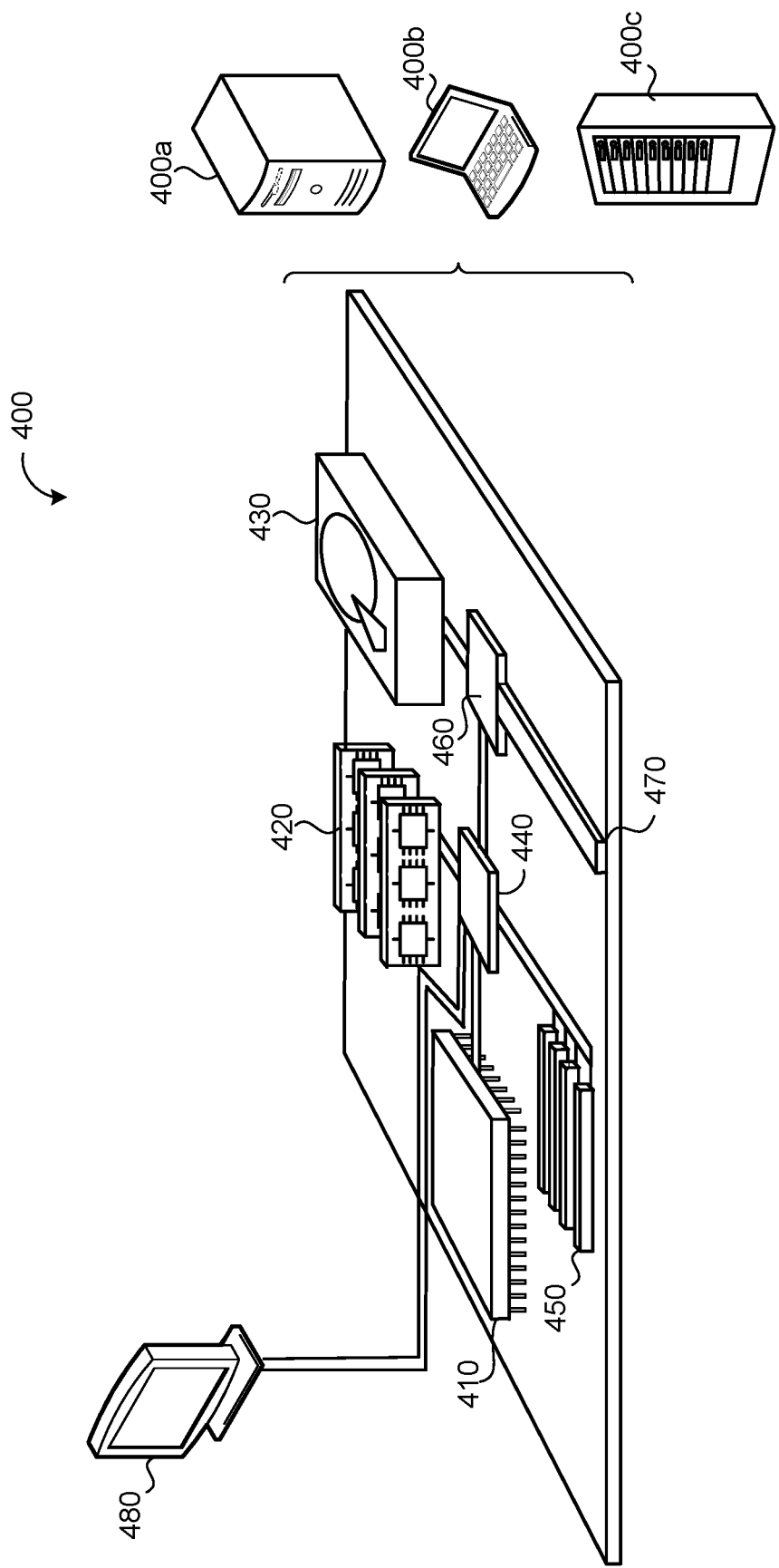
FIG. 4 is a schematic view of an example computing device that may be used to implement the systems and methods described herein.

FIG. 4 is a schematic view of an example computing device 400 that may be used to implement the systems (e.g., the remote system 130, the storage system 140, the query system 150, and/or the manager 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    receiving schemaless data from a user of a query system;
    extracting, without user input, a schema for the schemaless data by:
        parsing the schemaless data into a plurality of data paths; and
        organizing, based on the plurality of data paths, one or more values of the schemaless data into a plurality of columns, the plurality of columns organized according to the schema;
    storing, using the extracted schema, the schemaless data as a row entry in a table of a database in communication with the query system;
    receiving, from the user of the query system, a query for data associated with the database; and
    in response to the query:
        determining, based on the extracted schema, a respective column of the table that is responsive to the query;
        generating, using the extracted schema, a query response comprising a respective value of the row entry corresponding to the respective column that is responsive to the query; and
        transmitting the query response to the user.

2. The method of claim 1, wherein the schemaless data comprises semi-structured data.

3. The method of claim 1, wherein the schemaless data comprises JavaScript Object Notation (JSON).

4. The method of claim 3, wherein a respective column associated with the row entry of the schemaless data comprises an explicit null value.

5. The method of claim 3, wherein a respective column value of a respective column associated with the row entry of the schemaless data comprises an empty array.

6. The method of claim 1, wherein storing the schemaless data as the row entry in the table of the database further comprises:
    identifying a first data type and a second data type associated with a first data path among the plurality of data paths parsed from the schemaless data;
    storing a first value of the schemaless data corresponding to the first data type of the first data path in a first row entry of a first column of the table; and
    storing a second value of the schemaless data corresponding to the second data type of the first data path in a second row entry of the first column of the table.

7. The method of claim 6, wherein the second data type is a different data type than the first data type.

8. The method of claim 1, wherein the schemaless data corresponds to log data for cloud computing resources associated with the user.

9. The method of claim 1, wherein each data path of the plurality of data paths corresponds to a key for a key-value pair of the schemaless data.

10. The method of claim 1, wherein a respective column value of the row entry comprises a nested array.

11. A system comprising:
    data processing hardware; and
    memory hardware in communication with the data processing hardware, the memory hardware storing instructions that when executed on the data processing hardware cause the data processing hardware to perform operations comprising:
        receiving schemaless data from a user of a query system;
        extracting, without user input, a schema for the schemaless data by:

parsing the schemaless data into a plurality of data paths; and organizing, based on the plurality of data paths, one or more values of the schemaless data into a plurality of columns, the plurality of columns organized according to the schema;

storing, using the extracted schema, the schemaless data as a row entry in a table of a database in communication with the query system;

receiving, from the user of the query system, a query for data associated with the database; and in response to the query:

determining, based on the extracted schema, a respective column of the table that is responsive to the query;

generating, using the extracted schema, a query response comprising a respective value of the row entry corresponding to the respective column that is responsive to the query; and transmitting the query response to the user.

12. The system of claim 11, wherein the schemaless data comprises semi-structured data.

13. The system of claim 11, wherein the schemaless data comprises JavaScript Object Notation (JSON).

14. The system of claim 13, wherein a respective column associated with the row entry of the schemaless data comprises an explicit null value.

15. The system of claim 13, wherein a respective column value of a respective column associated with the row entry of the schemaless data comprises an empty array.

16. The system of claim 11, wherein storing the schemaless data as the row entry in the table of the database further comprises:

identifying a first data type and a second data type associated with a first data path among the plurality of data paths parsed from the schemaless data;

storing a first value of the schemaless data corresponding to the first data type of the first data path in a first row entry of a first column of the table; and storing a second value of the schemaless data corresponding to the second data type of the first data path in a second row entry of the first column of the table.

17. The system of claim 16, wherein the second data type is a different data type than the first data type.

18. The system of claim 11, wherein the schemaless data corresponds to log data for cloud computing resources associated with the user.

19. The system of claim 11, wherein each data path of the plurality of data paths corresponds to a key for a key-value pair of the schemaless data.

20. The system of claim 11, wherein a respective column value of the row entry comprises a nested array.

* * * * *